(12) United States Patent
Shargots (10) Patent No.: US 9,394,908 B2
(45) Date of Patent: Jul. 19, 2016

(54) PRESSURIZED WATER REACTOR WITH UPPER VESSEL SECTION PROVIDING BOTH PRESSURE AND FLOW CONTROL

(75) Inventor: Scott J. Shargots, Lynchburg, VA (US)

(73) Assignee: BWXT Nuclear Energy, Inc., Charlotte, NC (US)

( * ) Notice: Subject to any disclaimer, the term of this patent is extended or adjusted under 35 U.S.C. 154(b) by 584 days.

(21) Appl. No.: 13/109,120

(22) Filed: May 17, 2011

(65) Prior Publication Data

US 2012/0294405 A1    Nov. 22, 2012

(51) Int. Cl.
| | |
|---|---|
| G21C 15/243 | (2006.01) |
| F04D 7/08 | (2006.01) |
| G21C 1/08 | (2006.01) |
| G21C 1/32 | (2006.01) |
| G21C 19/28 | (2006.01) |
| F04D 29/60 | (2006.01) |
| G21D 1/00 | (2006.01) |

(52) U.S. Cl.
CPC ............... *F04D 7/08* (2013.01); *F04D 29/606* (2013.01); *G21C 1/086* (2013.01); *G21C 1/32* (2013.01); *G21C 15/243* (2013.01); *G21C 19/28* (2013.01); *G21D 1/006* (2013.01); *Y02E 30/32* (2013.01)

(58) Field of Classification Search
USPC .................. 376/347, 361, 366, 402, 406
See application file for complete search history.

(56) References Cited

U.S. PATENT DOCUMENTS

| | | | |
|---|---|---|---|
| 3,150,051 A * | 9/1964 | Ammon | ........................ 376/400 |
| 3,385,760 A | 5/1968 | Hawkins | |
| 3,401,082 A | 9/1968 | Ammon et al. | |
| 3,437,559 A | 4/1969 | Junkermann et al. | |
| 3,620,639 A | 11/1971 | Gaffal et al. | |
| 3,947,154 A | 3/1976 | Klepp et al. | |

(Continued)

FOREIGN PATENT DOCUMENTS

| | | |
|---|---|---|
| EP | 0164525 A1 | 12/1985 |
| EP | 0164525 B1 | 7/1989 |

(Continued)

OTHER PUBLICATIONS

The Iris Spool-Type Reactor Coolant Pump, J. M. Kujawski, et al., Proceedings of ICONE10, 10th International Conference on Nuclear Engineering, Arlington, VA, Apr. 14-18, 2002.

(Continued)

*Primary Examiner* — Jack W Keith
*Assistant Examiner* — Sharon M Davis
(74) *Attorney, Agent, or Firm* — Nelson Mullins Riley & Scarborough, LLP (57) ABSTRACT

A pressurized water reactor (PWR) includes a vertical cylindrical pressure vessel having a lower portion containing a nuclear reactor core and a vessel head defining an internal pressurizer. A reactor coolant pump (RCP) mounted on the vessel head includes an impeller inside the pressure vessel, a pump motor outside the pressure vessel, and a vertical drive shaft connecting the motor and impeller. The drive shaft does not pass through the internal pressurizer. A central riser may be disposed concentrically inside the pressure vessel, and the RCP impels primary coolant downward into a downcomer annulus between the central ser and the pressure vessel. A steam generator may be disposed in the downcomer annulus and spaced apart from with the impeller by an outlet plenum, A manway may access the outlet plenum so tube plugging can be performed on the steam generator via access through the manway without removing the RCP.

27 Claims, 9 Drawing Sheets

(56) References Cited

U.S. PATENT DOCUMENTS

| | | | |
|---|---|---|---|
| 3,955,856 A * | 5/1976 | Wayson et al. | 384/13 |
| 4,039,377 A | 8/1977 | Andrieu et al. | |
| 4,045,283 A | 8/1977 | Noyes et al. | |
| 4,057,467 A * | 11/1977 | Kostrzewa | 376/406 |
| 4,072,563 A | 2/1978 | McDonald et al. | |
| 4,158,602 A | 6/1979 | Minnick | |
| 4,844,857 A | 7/1989 | Conrads | |
| 5,045,274 A * | 9/1991 | Donaldson | 376/318 |
| 5,053,190 A * | 10/1991 | Gardner et al. | 376/366 |
| 5,089,218 A | 2/1992 | Gardner et al. | |
| 5,124,115 A * | 6/1992 | Dillmann | 376/372 |
| 5,165,305 A | 11/1992 | Veronesi | |
| 5,295,171 A | 3/1994 | Aburomia et al. | |
| 5,449,180 A | 9/1995 | Monjean et al. | |
| 5,465,280 A | 11/1995 | Wedellsborg | |
| 5,563,927 A | 10/1996 | Siegel et al. | |
| 5,583,900 A | 12/1996 | Kasahara et al. | |
| 5,715,288 A | 2/1998 | Matteson | |
| 5,789,720 A | 8/1998 | LaGally et al. | |
| 5,935,439 A | 8/1999 | Hart et al. | |
| 6,091,791 A | 7/2000 | Matsumoto et al. | |
| 6,259,760 B1 * | 7/2001 | Carelli et al. | 376/346 |
| 6,328,541 B1 | 12/2001 | Veronesi et al. | |
| 6,357,114 B1 | 3/2002 | Tang et al. | |
| 6,546,066 B2 | 4/2003 | Baliga et al. | |
| 6,618,460 B2 | 9/2003 | Baliga et al. | |
| 6,769,262 B1 | 8/2004 | Gray | |
| 6,813,328 B2 | 11/2004 | Kitch et al. | |
| 6,888,908 B1 | 5/2005 | Klarner et al. | |
| 6,909,765 B2 | 6/2005 | Lahoda | |
| 7,139,359 B2 | 11/2006 | Baliga et al. | |
| 7,389,669 B2 | 6/2008 | Badlani et al. | |
| 7,567,645 B2 | 7/2009 | Baliga | |
| 2004/0017877 A1 | 1/2004 | Hartel et al. | |
| 2004/0136488 A1 | 7/2004 | Tuite et al. | |
| 2005/0117684 A1 | 6/2005 | Klarner et al. | |
| 2005/0190877 A1 | 9/2005 | Knapp | |
| 2005/0199591 A1 | 9/2005 | Coe et al. | |
| 2007/0234839 A1 | 10/2007 | Cordivari | |
| 2010/0316181 A1 | 12/2010 | Thome et al. | |

FOREIGN PATENT DOCUMENTS

| | | |
|---|---|---|
| GB | 1115354 | 5/1968 |
| GB | 1115898 | 5/1968 |
| JP | S51114591 A | 10/1976 |
| JP | S60239694 A | 11/1985 |
| JP | S62291592 A | 12/1987 |
| JP | 0573279 U | 10/1993 |
| JP | 2009530567 A | 8/2009 |
| WO | 2007111810 A1 | 10/2007 |
| WO | 2010/059640 | 5/2010 |

OTHER PUBLICATIONS

International Search Report and Written Opinion for PCT/US2012/038401 dated Aug. 17, 2012.
European Search Report for EP 12785072.5 dated Dec. 11, 2014.
International Search Report and Written Opinion for PCT/US2012/057840 dated Jun. 5, 2013.
Office Action dated Dec. 8, 2015 for Japanese Patent Application No. 2014-511547.
Office Action dated Oct. 29, 2015 for Chinese Application No. 201210046889.8.

* cited by examiner

PRESSURIZED WATER REACTOR WITH UPPER VESSEL SECTION PROVIDING BOTH PRESSURE AND FLOW CONTROL

BACKGROUND

The following relates to the nuclear reactor arts, electrical power generation arts, nuclear reactor control arts, nuclear electrical power generation control arts, thermal management arts, and related arts.

In nuclear reactor designs for steam generation, such as boiling water reactor (BWR) and pressurized water reactor (PWR) designs, a radioactive reactor core is immersed in primary coolant water at or near the bottom of a pressure vessel. In BWR designs heat generated by the reactor core boils the primary coolant water creating steam that is extracted by components (e.g., steam separators steam dryer, or so forth) located at or near the top of the pressure vessel. In PWR designs the primary coolant is maintained in a compressed or subcooled liquid phase and is either flowed out of the pressure vessel into an external steam generator, or a steam generator is located within the pressure vessel (sometimes called an "integral PWR" design). In either design, heated primary coolant water heats secondary coolant water in the steam generator to generate steam. An advantage of the PWR design is that the steam comprises secondary coolant water that is not exposed to the radioactive reactor core.

In either a BWR design or a PWR design, the primary coolant flows through a closed circulation path. Primary coolant water flowing upward through the reactor core is heated and rises through a central region to the top of the reactor, where it reverses direction and flows downward back to the reactor core through a downcomer annulus defined between the pressure vessel and a concentric riser structure. This is a natural convection flow circuit for such a reactor configuration. However for higher power reactors it is advantageous or necessary to supplement or supplant the natural convection with motive force provided by electromechanical reactor coolant pumps.

In a conventional approach, glandless pumps are used, in which a unitary drive shaft/impeller subassembly is rotated by a pump motor. This design has the advantage of not including any seals at the drive shaft/impeller connection (hence the name "glandless"). For nuclear reactors, a common implementation is to provide a unitary reactor coolant pump comprising the sealless drive shaft/impeller subassembly, the motor (including the stator, a rotor magnet or windings, and suitable bearings or other drive shaft couplings), and a supporting flange that supports the motor and includes a graphalloy seal through which the drive shaft passes to connect the pump motor with the impeller. The reactor coolant pump is installed by inserting the impeller through an opening in the reactor pressure vessel and securing the flange over the opening. When installed the impeller is located inside the pressure vessel and the pump motor is located outside of the pressure vessel and preferably outside of any insulating material disposed around the pressure vessel). Although the motor is outside of the pressure vessel, sufficient heat still transfers to the pump motor so that dedicated motor cooling is typically provided in the form of a heat exchanger or the like. External placement of the pump motor simplifies electrical power connection and enables the pump motor to be designed for a rated temperature substantially lower than that of the primary coolant water inside the pressure vessel. Only the impeller and the impeller end of the drive shaft penetrate inside the pressure vessel.

Disclosed herein are improvements that provide various benefits that will become apparent to the skilled artisan upon reading the following.

BRIEF SUMMARY

In one aspect of the disclosure, an apparatus comprises a pressurized water reactor (PWR) including: a cylindrical pressure vessel with its cylinder axis oriented vertically; a nuclear reactor core disposed in the cylindrical pressure vessel; a separator plate disposed in the cylindrical pressure vessel that separates the pressure vessel to define an internal pressurizer containing a pressurizer volume disposed above the separator plate and a reactor vessel portion defining a reactor volume disposed below the separator plate and containing the nuclear reactor core, wherein the separator plate restricts but does not completely cut off fluid communication between the pressurizer volume and the reactor volume; and a reactor coolant pump including (i) an impeller disposed inside the pressure vessel in the reactor volume, (ii) a pump motor disposed outside of the pressure vessel, and (iii) a drive shaft operatively connecting the pump motor with the impeller, wherein (1) at least a portion of the pump motor is disposed above the separator plate and (2) no portion of the reactor coolant pump is disposed in the pressurizer volume.

In another aspect of the disclosure, a method comprises installing a reactor coolant pump comprising a pump motor, a driveshaft, and an impeller on a pressurized ate reactor (PWR) comprising a pressure vessel and a nuclear reactor core disposed in the pressure vessel, the installing including: mounting the pump motor at an opening of the pressure vessel with the mounted pump motor located outside of the pressure vessel and supported on the pressure vessel by a mounting flange; inserting the impeller inside the pressure vessel; and after the mounting and inserting, operatively connecting the inserted impeller to the mounted pump motor with the drive shaft.

In another aspect of the disclosure, a method comprises: providing a pressurized water reactor (PWR) comprising a pressure vessel, a nuclear reactor core disposed inside the pressure vessel, an internal steam generator comprising steam generator tubes disposed inside the pressure vessel, and an internal pressurizer defined at the top of the pressure vessel; supporting a plurality of reactor coolant pumps on the pressure vessel with pump motors of the reactor coolant pumps located outside of the pressure vessel and impellers of the reactor coolant pumps disposed inside the pressure vessel; and removing a head of the pressure vessel from the remainder of the pressure vessel by opening a closure of the pressure vessel and lifting the head away from the remainder of the pressure vessel wherein the head defines the internal pressurizer and supports the plurality of reactor coolant pumps such that removing the head of the pressure vessel simultaneously removes the internal pressurizer and the plurality of reactor coolant pumps.

In another aspect of the disclosure, an apparatus comprises a pressurized water reactor (PWR) including: a nuclear reactor core; a pressure vessel having a closure by which an upper vessel head of the pressure vessel is removable, wherein the nuclear reactor core is disposed in the pressure vessel below the vessel head and wherein the upper vessel head includes an internal pressurizer defining a pressurizer volume with heaters configured to control PWR pressure; and a plurality of reactor coolant pumps mounted on the vessel head such that the vessel head and plurality of reactor coolant pumps are removable as a unit, each reactor coolant pump including (i) an impeller disposed inside the pressure vessel below the internal pressurizer, (ii) a pump motor disposed outside of the pressure vessel, and (iii) a drive shaft operatively connecting the pump motor with the impeller, wherein no portion of any reactor coolant pump is disposed in the pressurizer volume.

In another aspect of the disclosure, an apparatus comprises a pressurized water reactor (PWR) including: a nuclear reactor core comprising a fissile material; a e cylindrical pressure vessel with its cylinder axis oriented vertically, the cylindrical pressure vessel having a lower portion containing the nuclear reactor core and a vessel head defining an internal pressurizer; and a reactor coolant pump mounted on the vessel head and including (i) an impeller disposed inside the pressure vessel, (ii) a pump motor disposed outside of the pressure vessel, and (iii) a vertical drive shaft connecting the pump motor and the impeller, the vertical drive shaft being oriented parallel with the vertically oriented cylinder axis of the cylindrical pressure vessel and not passing through the internal pressurizer.

In another aspect of the disclosure, in an apparatus as set forth in the immediately preceding paragraph the PWR further includes: a hollow cylindrical central riser disposed concentrically with and inside the cylindrical pressure vessel, the impeller of the reactor coolant pump being configured to impel primary coolant water downward into a downcomer annulus defined between the hollow cylindrical central riser and the cylindrical pressure vessel; and an internal steam generator disposed in the downcomer annulus wherein the impeller of the reactor coolant pump and the internal steam generator are spaced apart by an outlet plenum. In some such apparatus, the cylindrical pressure vessel includes a manway providing access to the outlet plenum, and a method is performed including opening the manway and performing steam generator tube plugging on the internal steam generator via access through the manway without removing the reactor coolant pump.

BRIEF DESCRIPTION OF THE DRAWINGS

The invention may take form in various components and arrangements of components, and in various process operations and arrangements of process operations. The drawings are only for purposes of illustrating preferred embodiments and a re no to be construed as limiting the invention.

DETAILED DESCRIPTION OF THE PREFERRED EMBODIMENTS

With reference to FIGS. 1-4, a pressurized water reactor (PWR) includes a cylindrical pressure vessel 10. As used herein, the phrase "cylindrical pressure vessel" indicates that the pressure vessel has a generally cylindrical shape, but may in some embodiments deviate from a mathematically perfect cylinder. For example, the illustrative cylindrical pressure vessel 10 has a circular cross-section of varying diameter along the length of the cylinder, and has rounded ends, and includes various vessel penetrations, vessel section flange connections, sand so forth. The cylindrical pressure vessel 10 is mounted in an upright position having an upper end 12 and a lower end 14. However, it is contemplated for the upright position to deviate from exact vertical orientation of the cylinder axis. For example, if the PWR is disposed in a maritime vessel then it may be upright but with some tilt, which may vary with time, due to movement of the maritime vessel on or beneath the water. The PWR further includes a diagrammatically indicated radioactive nuclear reactor core 16 comprising a mass of fissile material, such as a material containing uranium oxide ($UO_2$) that is enriched in the fissile $^{235}U$ isotope, arranged fuel rod bundles or so forth disposed in a fuel basket or other support assembly configured to mount in suitable mounting brackets or retention structures of the pressure vessel 10 (core mounting features not shown). Reactivity control is provided by a diagrammatically indicated control rod system 18, typically comprises assemblies of control rods that are mounted on connecting rods, spiders, or other support elements. The control rods comprise a neutron absorbing material and the control rod assemblies (CRA's) are operatively connected with control rod drive mechanism (CRDM) units that controllably insert or withdraw the control rods into or out of the reactor core 16 to control or stop the chain reaction. As with the reactor core 16, the control rod system 18 is shown diagrammatically and individual components such as individual control rods, connecting rods, spiders, and CRDM units are not shown. The diagrammatically illustrated control rod system is an internal system in which the CRDM units are disposed inside the pressure vessel 10. Some illustrative examples of internal control rod system designs include: Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Intl Pub. WO 2010/144563 A1 published Dec. 16, 2010 which is incorporated herein by reference in its entirety. Alternatively, external CRDM units may be used—however, external CRDM units require mechanical penetrations through the top or bottom of the pressure vessel 10 to connect with the control rods.

In its operating state, the pressure vessel 10 of the PWR contains primary coolant water that serves as primary coolant and as a moderator material that thermalizes neutrons. The illustrative PWR includes an integral pressurizer as follows. A separator plate 20 is disposed in the cylindrical pressure vessel 10. The separator plate 20 separates the pressure vessel 10 to define: (1) an internal pressurizer 22 containing a pressurizer volume disposed above the separator plate 20; and (2) a reactor vessel portion 24 defining a reactor volume disposed below the separator plate 20. The nuclear reactor core 16 and the control rod system is disposed in the reactor volume. The separator plate 20 restricts but does not completely cut off fluid communication between the pressurizer volume and the reactor volume. As a result, pressure in the pressurizer volume communicates to the reactor volume so that the operating pressure of the reactor volume can be adjusted by adjusting pressure in the pressurizer volume. Toward this end, a steam bubble is maintained in the upper portion of the pressurizer volume, and the internal pressurizer 22 includes heater elements 26 for applying heat to increase the temperature (and hence increase pressure) in the internal pressurizer 22. Although not shown, spargers may also be provided to inject cooler steam or water to lower the temperature (and hence pressure) in the internal pressurizer 22. In a PWR the primary coolant water is maintained in a subcooled state. By way of illustrative example, in some contemplated embodiments the primary coolant pressure in the sealed volume of the pressure vessel 10 is at a pressure of about 2000 psia and at a temperature of about 300-320° C. Again, this is merely an illustrative example, and a diverse range of other subcooled PWR operating pressures and temperatures are also contemplated.

The reactor core 16 is disposed in the reactor volume, typically near the lower end 14 of the pressure vessel 10, and is immersed in the primary coolant water which fills the pressure vessel 10 except for the steam bubble of the internal pressurizer 22. (The steam bubble also comprises primary coolant, but in a steam phase). The primary coolant water is heated by the radioactive chain reaction occurring in the nuclear reactor core 16. A primary coolant flow circuit is defined by a cylindrical central riser 30 disposed concentrically with and inside the cylindrical pressure vessel 10, and more particularly in the reactor volume. Heated primary coolant water rises upward through the central riser 30 until it reaches the to of the riser, at which point it reverses flow and falls through a downcomer annulus 32 defined between the cylindrical central riser 30 and the cylindrical pressure vessel 10. At the bottom of the downcomer annulus 32 the primary coolant water flow again reverses and flows back upward through the nuclear reactor core 16 to complete the circuit.

In some embodiments, an annular internal steam generator 36 is disposed in the downcomer annulus 32. Secondary coolant water flows into a feedwater inlet 40 (optionally after buffering in a feedwater plenum), through the internal steam generator 36 where it is heated by proximate primary coolant in the downcomer annulus 32 and converted to steam, and the steam flows out a steam outlet 42 (again, optionally after buffering in a steam plenum). The output steam may be used for driving a turbine to generate electricity or for some other use (external plant features not shown). A PWR with an internal steam generator is sometimes referred to as an integral PWR, an illustrative example of which is shown in Thome et al., "Integral Helical Coil Pressurized Water Nuclear Reactor", U.S. Pub. No. 2010/0316181 A1 published Dec. 16, 2010 which is incorporated herein by reference in its entirety. While this publication discloses a steam generator employing helical steam generator tubes, other tube geometries including straight (e.g., vertical) once-through steam generator tubes, or recirculating steam generators, or U-Tube steam generators, or so forth are also contemplated.

Figure 3:
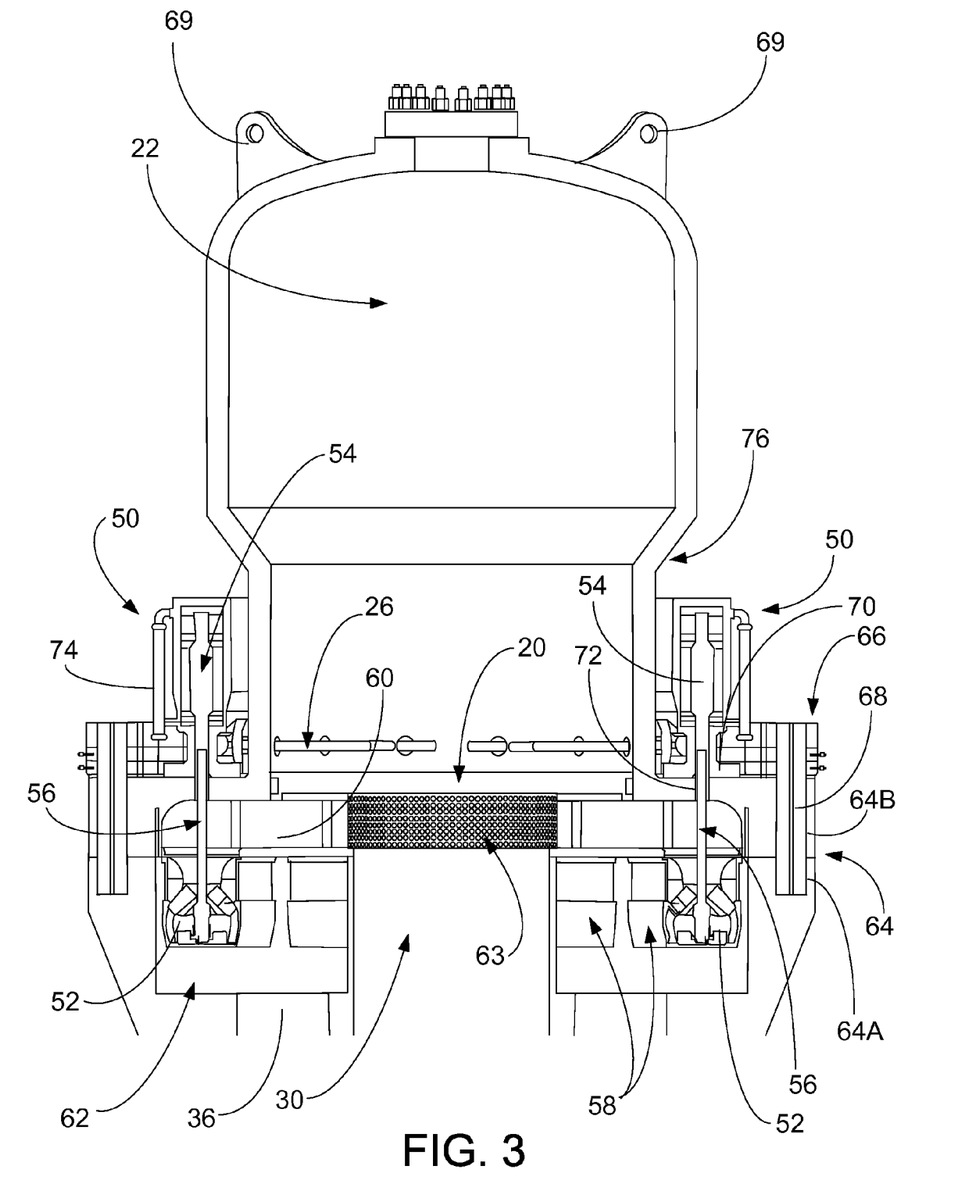
FIG. 3 diagrammatically shows a side sectional view of he vessel head region of the PWR of FIG. 1 including the internal pressurizer and RCPs.
Figure 4:
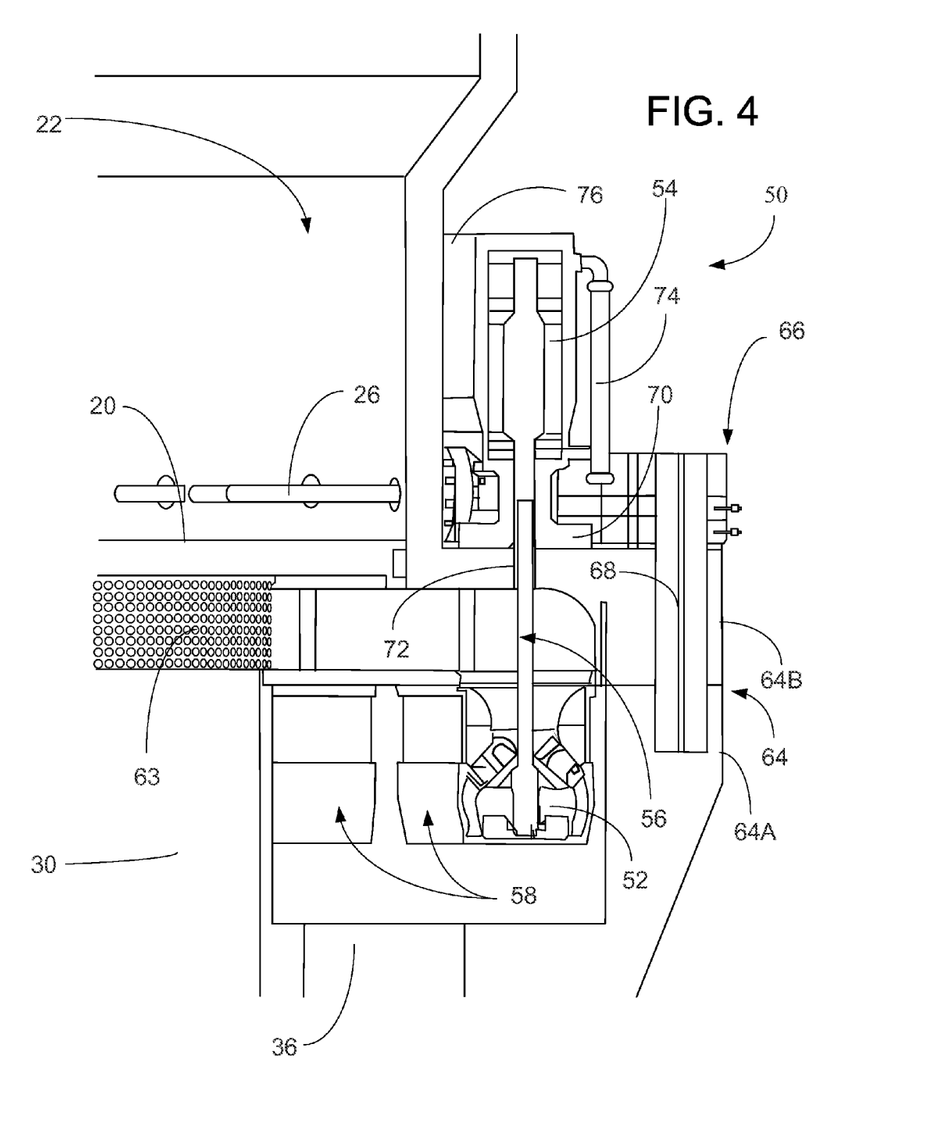
FIG. 4 diagrammatically shows a side sectional view of one of the reactor coolant pumps (RCPs).

In embodiments disclosed herein, circulation of the primary coolant water is assisted or driven by reactor coolant pumps (RCPs) 50. With particular reference to FIG. 4 each reactor coolant pump (RCP) 50 includes: an impeller 52 disposed inside the pressure vessel 10 (and more particularly in the reactor volume); a pump motor 54 disposed outside of the pressure vessel 10; and a drive shaft 56 operatively connecting the pump motor 54 with the impeller 52. At least a portion of the pump motor 54 is disposed above the separator plate 20, and no portion of the reactor coolant pump 50 is disposed in the pressurizer volume of the internal pressurizer 22. Each RCP 50 of the embodiment of FIGS. 1-4 further includes an annular pump casing 58 cont wrung the impeller 52.

Locating the RCPs 50 proximate to the internal pressurizer 22 places the openings in the pressure vessel 10 for passage of the drive shafts 6 at elevated positions. This elevated placement reduces the likelihood of substantial primary coolant loss in the event of a loss of coolant accident (LOCA) involving the RCPs 50. Moreover, the impellers 52 operate at the "turnaround" point of the primary coolant flow circuit, that is, at the point where the primary coolant water reverses flow direction from the upward flow through the central riser 30 to the downward flow through the downcomer annulus 32. Since this flow reversal already introduces some flow turbulence any additional turbulence introduced by operation of the RCPs 50 is likely to be negligible. The RCPs 50 also do not impede natural circulation, which facilitates the implementation of various passive emergency cooling systems that rely upon natural circulation in the event of a loss of electrical power for driving the RCPs 50. Still further, the RCPs 50 are also far away from the reactor core 16 and hence are unlikely to introduce flow turbulence in the core 16 (with its potential for consequent temperature variability).

Figure 1:
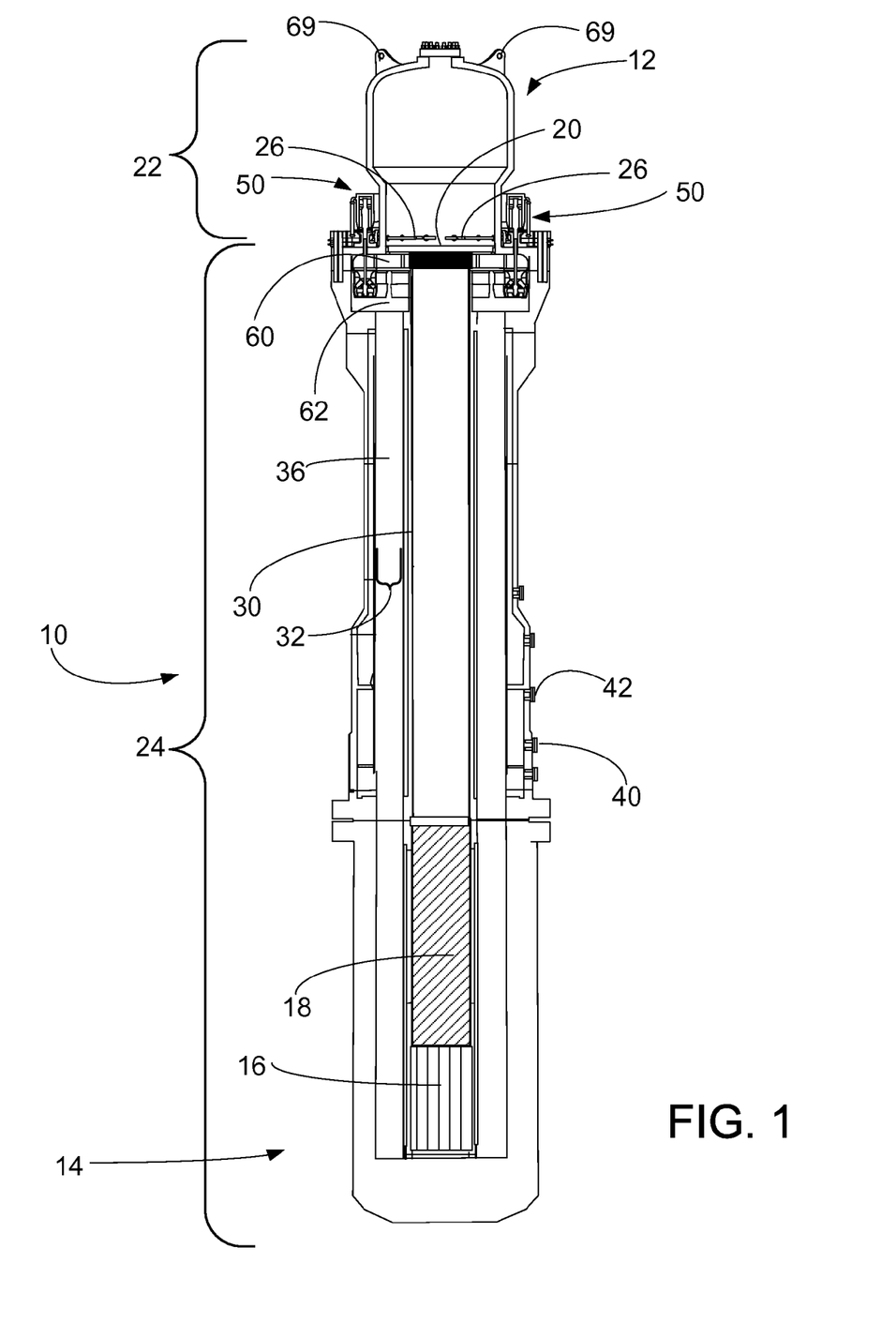
FIG. 1 diagrammatically shows a side sectional view of a pressurized water reactor (PWR) including an internal pressurizer and reactor coolant pumps (RCPs).
Figure 2:
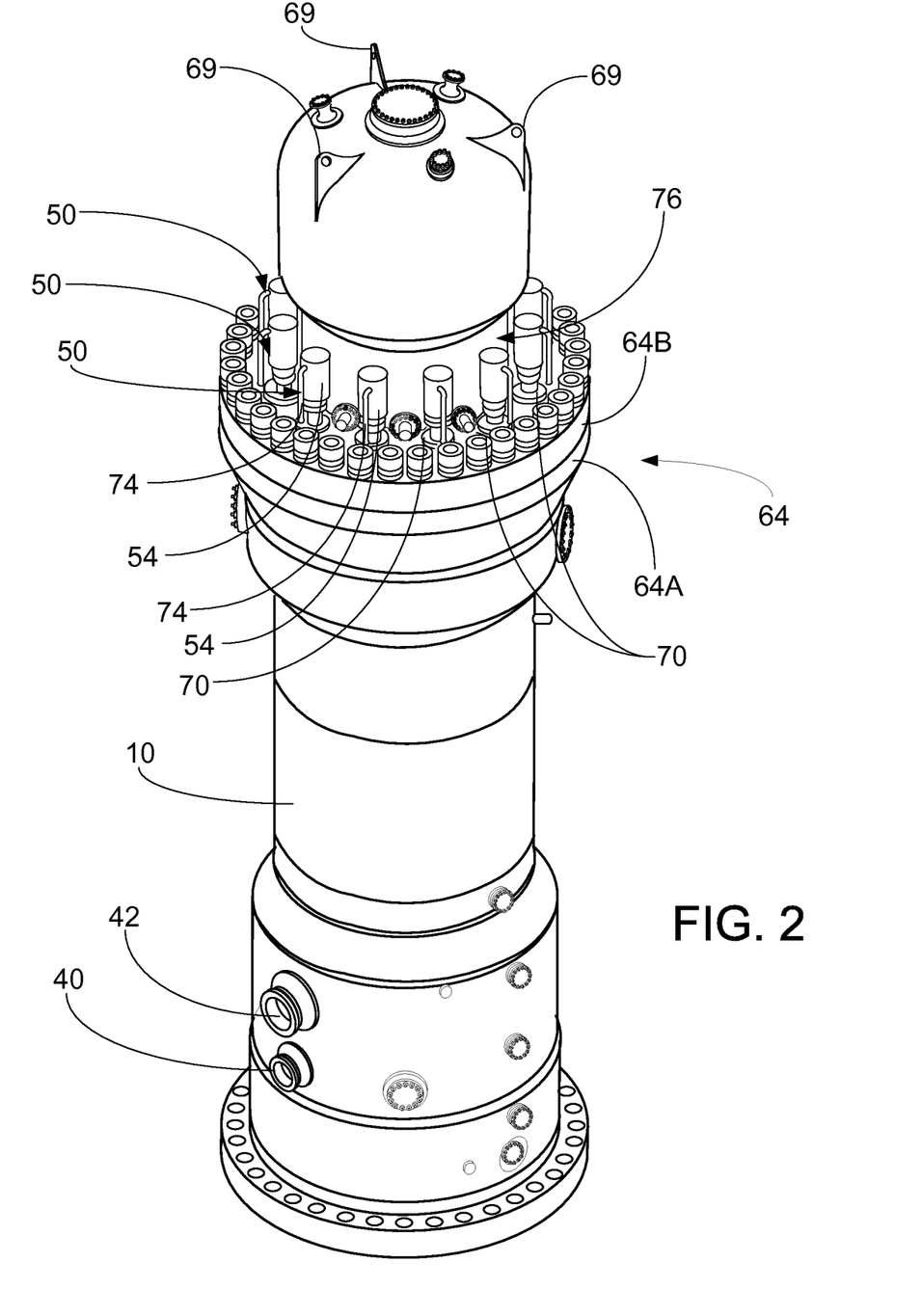
FIG. 2 diagrammatically shows a perspective view of the upper vessel section of the PWR of FIG. 1.

On the other hand, the placement of the RCPs 50 at the elevated position has the potential to introduce turbulence in the primary coolant water flow into the internal steam generator 36. To reduce any such effect, in the embodiment of FIGS. 1-4 the RCPs 50 are buffered by an inlet plenum 60 and an outlet plenum 62. Primary coolant water flowing out of the top of the cylindrical central riser 30 flows into the inlet plenum 60 where the flow reverses direction, aided by the RCPs 50 which impel the primary coolant water to flow downward into the downcomer annulus 32. Said another way, the RCPs 50 discharge primary coolant into the outlet plenum 62 which separates the RCPs 50 from the internal steam generator 36. As seen in FIGS. 1, 3, and 4, the RCTs 50 discharge primary coolant into the outlet plenum 62 at a radial location that is outboard from the annular internal steam generator 36 disposed in the downcomer annulus 32. Optionally, a flow diverter element or structure may be provided at or proximate to the top of the central riser 30 to assist in the flow reversal. In the illustrative embodiment, a flow diverter screen 63 serves this purpose; however, in other embodiments other diverter elements or structures may be used. By way of additional illustrative examples, the flow diverter or structure may be embodied by side openings near the top of the central riser, or by shaping the separator plate to serve as a flow diverter. Alternatively, a flow diverter structure may be on the plenum 62.

The RCPs 50 output impelled primary coolant water into the output plenum 62 which buffers flow from the pumps into the annular steam generator 36. The primary coolant flows from the outlet plenum 62 either into the steam generator tubes embodiments in which the higher pressure primary coolant flows inside the steam generator tubes) or into a volume surrounding the steam generator tubes (in embodiments in which the higher pressure primary coolant flows outside the steam generator tubes). In either case, the primary coolant flow from the RCPs 50 into the steam generator 36 is buffered so as to reduce flow inhomogeneity. Additionally, because each RCP 50 outputs into the outlet plenum 62 and is not mechanically connected with an inlet of the internal steam generator 36, the failure of one RCP 50 is less problematic. (By comparison, if the RCPs are mechanically coupled into specific inlets of the steam generator, for example by constructing the pump casing so that its outlet is coupled with an inlet of the steam generator, then the failure of one RCP completely removes the coupled portion of the steam generator from use).

Another advantage of the illustrative RCPs 50 is that they are mounted using small openings in the pressure vessel 10. In particular, in some embodiments the opening through which the driveshaft 56 passes is too small for the impeller 52 to pass through. Conventionally such an arrangement would be impractical, because conventionally the RCP is manufactured and installed as a unit by inserting the impeller through the opening in the pressure vessel.

Figure 5:
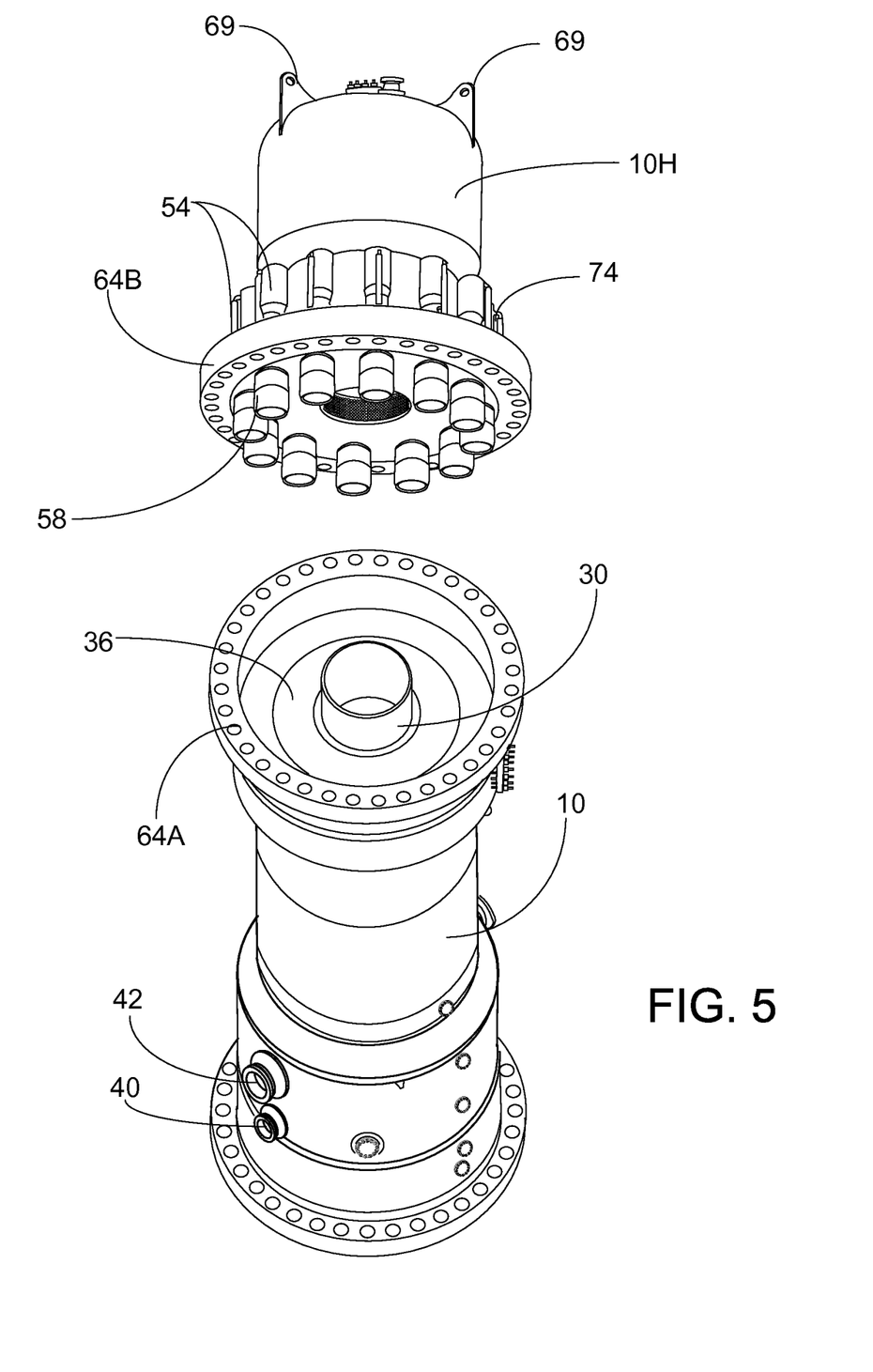
FIG. 5 diagrammatically shows a perspective view of the upper vessel of the PWR of FIG. 1 with the closure opened to remove the vessel head from the remainder of the vessel, and with the vessel head and remainder of the vessel both tilted to reveal selected internal components.

With reference to FIG. 5, to enable the disclosed approach in which the opening is too small for the impeller 52 to pass through, the pressure vessel 10 includes a closure 64 at or below the separator plate 20 and (in the illustrative example) at or above the top of the internal steam generator 36. The closure 64 includes mating flanges 64A, 64B that seal together in mating fashion with suitable fasteners such as an illustrated combination of cooperating tension nuts 66 and tension studs 68. In this way, a head 10H of the pressure vessel 10 can be removed from the remainder of the pressure vessel 10 by opening the closure 64 (e.g., by removing the fasteners 66, 68) and lifting off the vessel head via lifting lugs 6 thus separating the flanges 64A, 64B see FIG. 5, but note that FIG. 5 diagrammatically shows the head 10H and vessel remainder each tilted to reveal internal components whereas, typically the head 10H is removed by lifting it straight up, i.e. vertically, using a crane or the like and then optionally moving the lifted head 10H laterally to a docking location. The vessel head 10H defines the internal pressurizer 22 and also includes the portion of the pressure vessel 0 that supports the RCPs 50. Therefore, removing the head 10H of the pressure vessel 10 simultaneously removes the internal pressurizer 22 and the RCPs 50. Removal of the vessel head 10H exposes the upper and lower surfaces of the outlet plenum 62 and provides access from above to the internal steam generator 36 for performing steam generator inspection, maintenance and/or servicing. Additionally, as seen in FIG. 5 removal of the vessel head 10H provides access from below to the pump casings 58 (which contain the impellers 52). Thus, during a maintenance period during which the pressure vessel 10 is depressurized and the vessel head 10H removed, an impeller 52 can be removed and replaced while the pump motor 54 and driveshaft 56 remain in place on the head of the pressure vessel 10. Similarly, the pump casing 58 could be replaced if needed.

The RCP 50 can be installed as follows. The pump motor 54 is mounted at an opening of the pressure vessel 10 with the mounted pump motor 54 located outside of the pressure vessel 10 and supported on the pressure vessel 10 by a mounting flange 70. The impeller 52 is inserted inside the pressure vessel 10, for example via the opened closure 64. Then, after mounting the pump motor 54 and inserting the impeller 52, the inserted impeller 52 is operatively connected to the mounted pump motor 54 by the drive shaft 56. In some embodiments the drive shaft 56 is operatively connected h the pump motor 54 before the pump motor 54 is mounted at the opening of the pressure vessel 10. in such embodiments the mounting of the pump motor 54 includes inserting the drive shaft 56 into the opening of the pressure vessel 10. In such embodiments the opening of the pressure vessel suitably includes a self-lubricating graphalloy bearing 72, and the mounting comprises inserting the drive shaft 56 into the opening of the pressure vessel such that the drive shaft 56 is supported in the opening by the graphalloy bearing 72.

By employing the illustrative embodiment in which the opening for the RCP 50 is too small for the impeller to pass these openings are made small so as to minimize the likelihood and extent of a loss of coolant accident (LOCA) at these openings. In some contemplated embodiments, the openings may be 3 inches (7.62 cm in diameter, smaller. Although not explicitly illustrated, it is to be understood that the mounting flange 70 may include a metal gasket, o-ring, or other sealing element to provide further sealing additional to the sealing provided by the graphalloy bearing 72.

The number of RCPs 50 is selected to provide sufficient motive force for maintaining the desired primary coolant flow through the primary coolant circuit. Additional RCPs 50 may be provided to ensure redundancy in the event of failure of one or two RCPs. If there are N reactor coolant pumps (where N is an integer greater than or equal to 2, for example N=12 in some embodiments) then they are preferably spaced apart evenly, e.g. at 360°/N intervals around the cylinder axis of the cylindrical pressure vessel 10 (e.g., intervals of 30° for N=12). The externally mounted pump motors 54 are advantageously spaced apart from the high temperature environment inside the pressure vessel 10. Nonetheless, substantial heat is still expected to flow into the pump motors 54 by conduction through the flanges 70 and by radiation/convection from the exterior of the pressure vessel 10. Accordingly, in the illustrative embodiment the RCPs 50 further include heat exchangers 74 for removing heat from the pump motors 54. Alternative thermal control mechanisms cart be provided, such as an open-loop coolant flow circuit carrying water, air, or another coolant fluid. Moreover, it is contemplated to omit such thermal control mechanisms entirely if the pump motors 54 are rated for sufficiently high temperature operation.

Another advantage of the illustrative configuration is that the pump motor 54 of the RCP 50 is mounted vertically, with the drive shaft 56 vertically oriented and parallel with the cylinder axis of the cylindrical pressure vessel 10. This vertical arrangement eliminates sideways forces on the rotating motor 54 and rotating drive shaft 56, which in turn reduces wear on the pump motor 54, on the graphalloy bearing 72, and on internal bearings supporting the drive shaft 56 within the pump motor 54.

Yet another advantage of the illustrative configuration are that no portion of the RCP 50 passes through the internal pressurizer volume. This simplifies design of he internal pressurizer 22 and shortens the length of the drive shaft 56. However, since conventionally the pressurizer is located at the top of he pressure vessel achieving this arrangement in combination with vertically oriented pump motors 54 and vertically oriented drive shafts 56 entails reconfiguring the pressurize. In the embodiment of FIGS. 1-5, the cross-section of the vessel head of the cylindrical pressure vessel 10 includes a narrowed portion defining a recess 76 of the internal pressurizer 22. The recess 76 allows the pump motors 54 to be disposed at least partially in the recess 76 so as to provide sufficient room for the vertically mounted pump motors 54.

Still yet another advantage of placing the RCPs 50 at he head of the pressure vessel is that this arrangement does not occupy space lower down in the pressure vessel, thus leaving that space available for accommodating internal CRDM units a larger steam generator, or so forth.

The embodiment of FIG. 1-5 is illustrative, and it is contemplated that he various components such as the internal pressurizer 22, the RCPs 50, and so forth may be modified in various ways. With reference to FIGS. 6-9, some additional illustrative embodiments are set forth.

Figure 6:
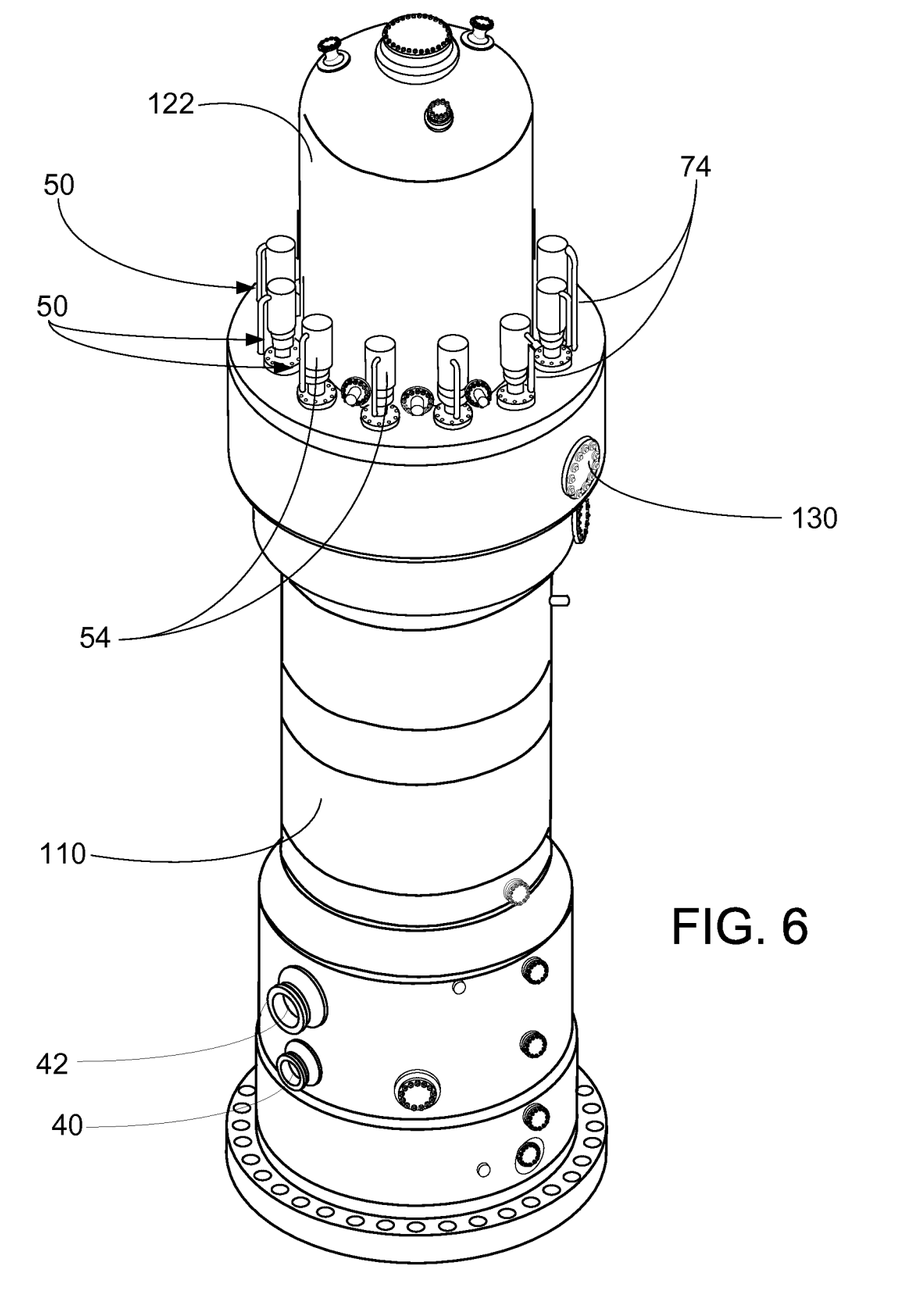
FIG. 6 diagrammatically shows a perspective view of an alternative embodiment of the upper vessel section that omits the closure for removing the vessel head and that employs a differently shaped internal pressurizer.

With reference to FIG. 6, an alternative embodiment of the upper vessel section is shown. The alternative embodiment of FIG. 6 differs from the embodiment of FIGS. 1-5 in that it has a modified pressure vessel 110 in which (1) the closure 64 for removing the vessel head is omitted and (2) a differently shaped internal pressurizer 122 is provided.

Unlike the internal pressurizer 22 of the embodiment of FIGS. 1-5 which included the recess 76 for accommodating the RCPs 50, the internal pressurizer 122 is instead narrowed (that is, of smaller cross-section diameter) over its entire height to accommodate the RCPs 50. This approach has the advantage of providing more vertical space for mounting the pump motors 54 (which can be especially advantageous if a long drive shaft is inserted when the motor is installed). A disadvantage of the internal pressurizer 122 as compared with the pressurizer 22 is that the former has reduced a reduced pressurizer volume due to its being narrowed over its entire height rather than over only the recess 76.

Since the closure 64 is omitted in the embodiment of FIG. 6 the vessel head is not removable and accordingly the head lifting lugs 69 of the embodiment of FIGS. 1-5 are also omitted in he embodiment of FIG. 6. The embodiment of FIG. 6 can employ the same RCP mounting arrangement as is used in the embodiment of FIGS. 1-5, including mounting the RCP 50 at an opening of the pressure vessel that is too small for the impeller to pass through. Since the vessel head is not removable to allow insertion of the impeller another access pathway such as an illustrative manway 130 is suitably provided for inserting the impeller into the pressure vessel and accommodating the subsequent installation of the impeller onto the drive shaft of the mounted pump motor/drive shaft assembly. The manway 130 is typically already required to provide access for performing steam generator tube plugging or other maintenance operations—accordingly, no additional vessel penetration is required to enable the use of the disclosed pumps installed at small vessel openings.

Figure 7:
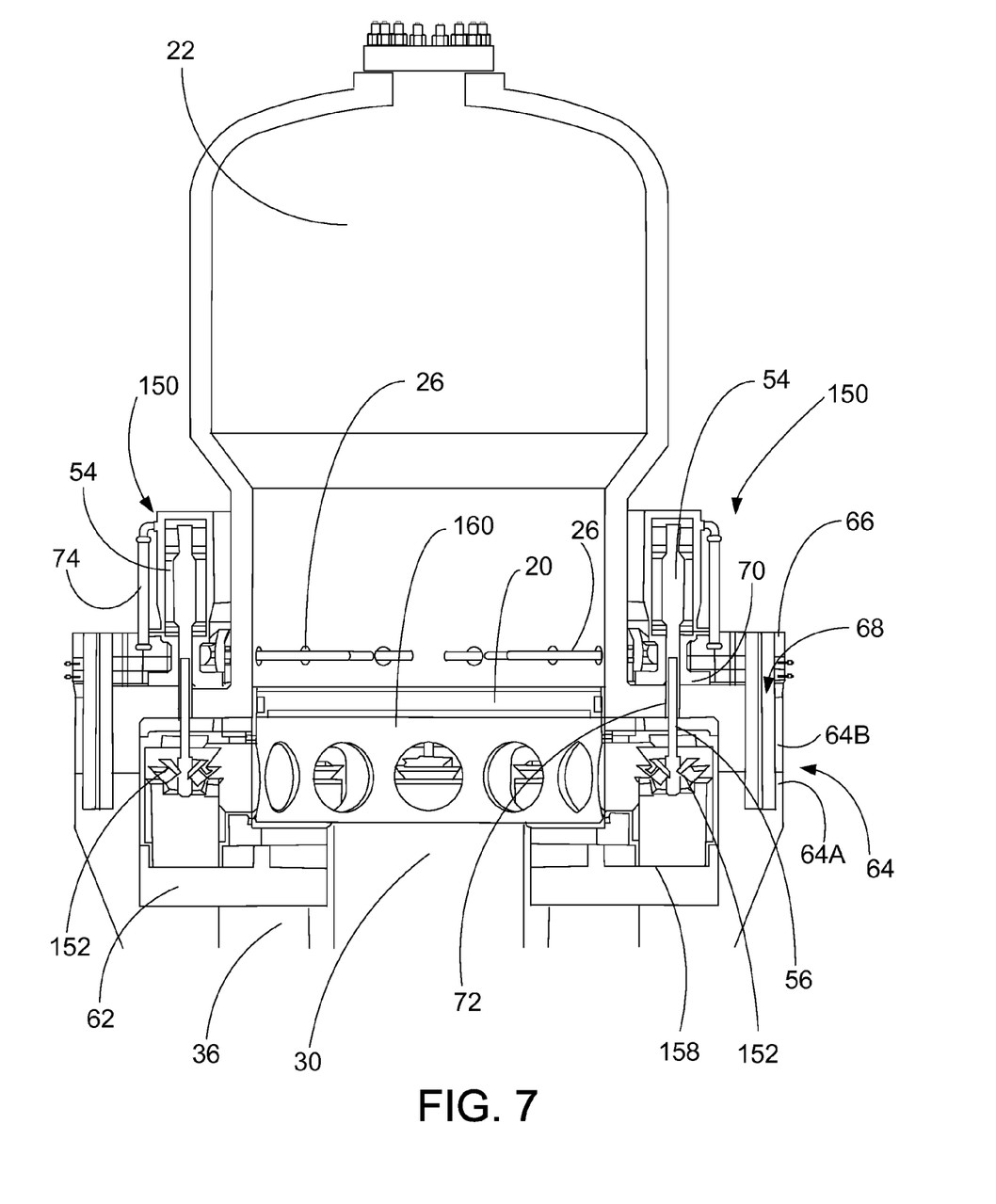
FIG. 7 diagrammatically shows a side sectional view of an alternative embodiment of the vessel head region of the PWR of FIG. 1 that includes an alternative RCP embodiment.
Figure 8:
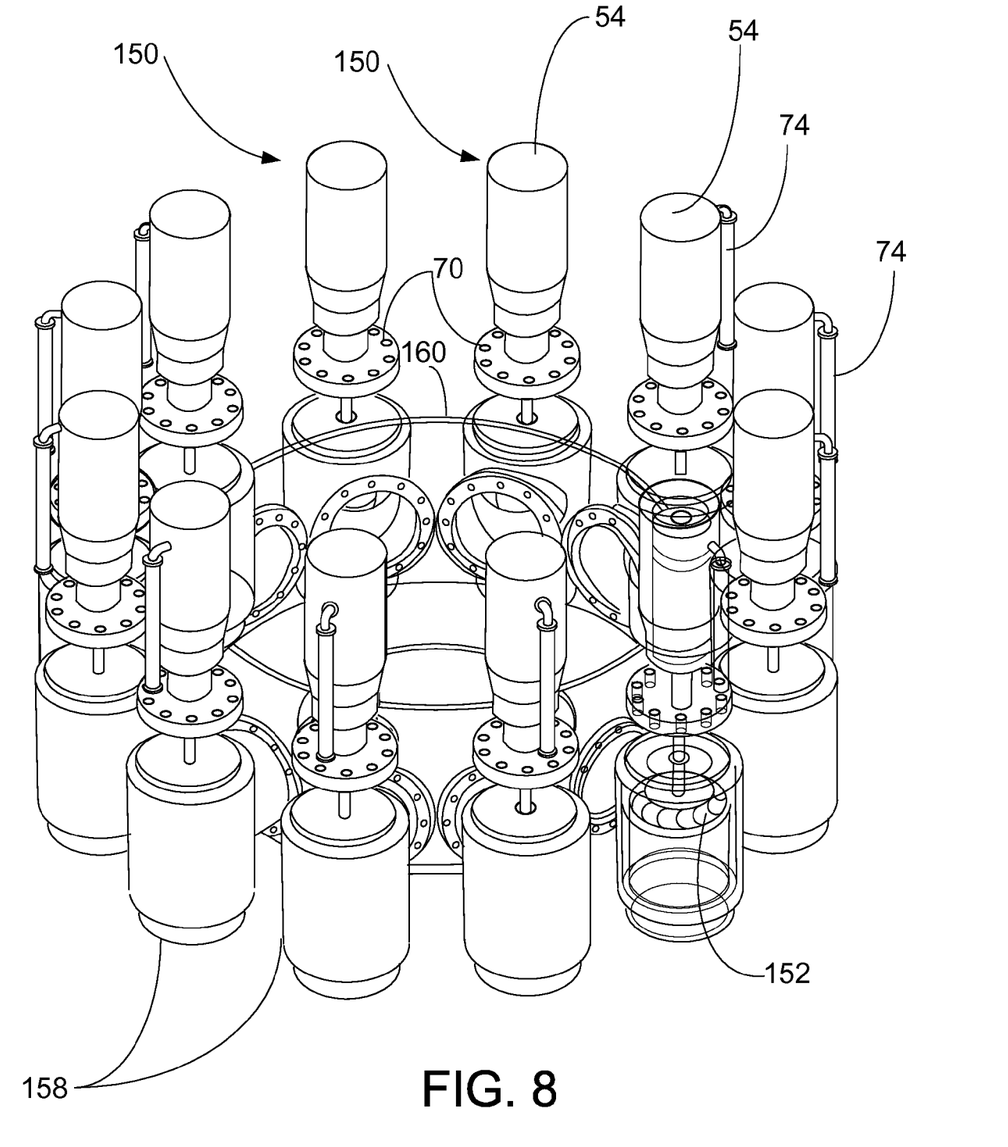
FIG. 8 diagrammatically shows a perspective view of the alternative RCP of FIG. 7 isolated from the remainder of the PWR.

With reference to FIG. 7, an alternative embodiment of the upper vessel section is shown. The alternative embodiment of FIG. 7 differs from the embodiment of FIGS. 1-5 in that it employs different reactor coolant pumps (RCPs) 150 and replaces the inlet plenum 60 with a pump inlet manifold 160 that distributes primary coolant flowing out of the top of the central riser 30 into the plurality of RCPs 150. FIG. 8 illustrates the RCPs 150 and manifold 160 in isolation from the remainder of the upper vessel section. The RCPs 150 differ from the RCPs 50 in that instead of the annular pump casings 58 of the RCPs 50 of the embodiment of FIGS. 1-5, the RCPs 150 of the embodiment of FIGS. 7-8 employ 90° angle pump casings 158 that include a 90° turn to facilitate turning the primary coolant flow 90° from flowing horizontal at the pump inlet (that is, inflowing from the manifold 160) to flowing downward at the outlet into the outlet plenum 62. As in the embodiment of FIGS. 1-5, the RDPs 150 discharge primary coolant into the outlet plenum 62 at a radial location that is outboard from the annular internal steam generator 36 disposed in the downcomer annulus 32. The RCPs 150 include impellers 152 that may be the same as the impellers 52, or that may be differently designed, for example with impeller blades shaped to better facilitate the 90° flow turn. In this embodiment the flow diverter screen 63 of the embodiment of FIGS. 1-5 is omitted since its function is substantially performed by the pump inlet manifold 160 and the 90° angled pump casings 158; alternatively the screen 63 or another flow diverter structure may be employed.

Figure 9:
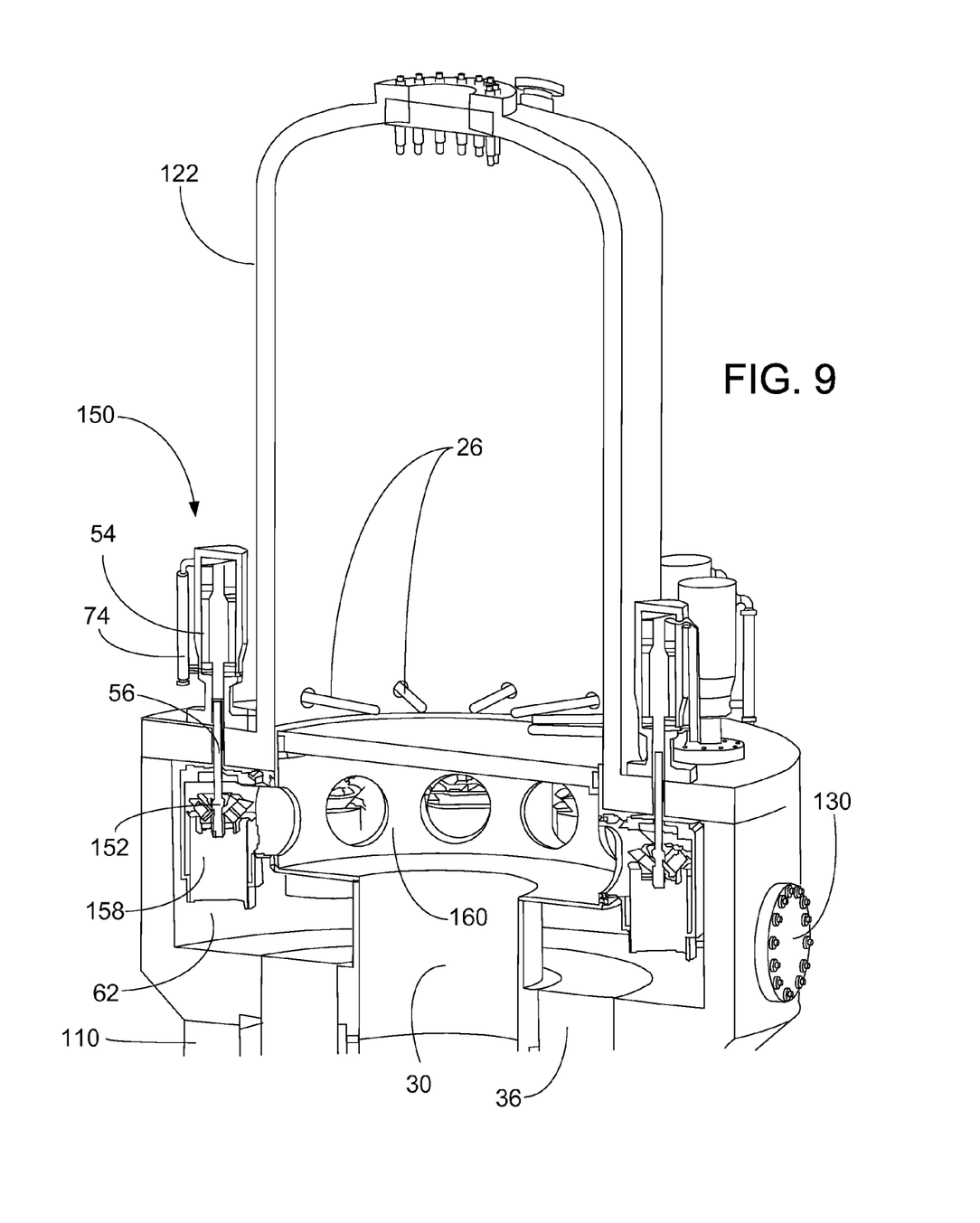
FIG. 9 diagrammatically shows a sectional perspective view of an alternative embodiment of the vessel head region of the PWR of FIG. 1 that includes the alternative RCP embodiment of the embodiment of FIGS. 7-8 and the alternative internal pressurizer of the embodiment of FIG. 6 that omits the closure and employs the differently shaped internal pressurizer.

With reference to FIG. 9, a further embodiment is shown, in which the embodiment of FIGS. 1-5 is modified by including the modifications of both the pressure vessel 110 with its modified internal pressurizer 122 and omission of the closure 64 as per the embodiment of FIG. 6, and the 90° angled pumps 150 of the embodiment of FIGS. 7-8. FIG. 9 shows a sectional perspective view of the head region, and shows that the RCPs 150 are at a larger diameter than the steam generator 36. Thus, the RCPs 150 discharge primary coolant into the outlet plenum 62 at a radial location that is outboard from the annular internal steam generator 36 disposed in the downcomer annulus 32. This radial offset between the steam generator 30 and the RCPs 150 enables steam generator tube plugging to be performed via the manway 130 and outlet plenum 62 without removing the RCPs 150. Conversely, the impeller of an RCP can be replaced via the manway 130 and the outlet plenum 62 without removing the steam generator 36.

The illustrative embodiments are examples of contemplated variations and variant embodiments; additional variations and variant embodiments that are not illustrated are also contemplated. For example, while the illustrative PWR is an integral PWR including the internal steam generator 36, in some contemplated alternative embodiments an external steam generator is instead employed, in which case the feedwater inlet 40 and steam outlet 42 are replaced by a primary coolant outlet port to the steam generator and a primary coolant inlet port returning primary coolant from the steam generator (alternative embodiment not shown). Moreover, while advantages are identified herein to not mechanically coupling the RCPs 50 to the internal steam generator, it is alternatively contemplated to couple the RCPs to the steam generator inlet, for example by replacing the outlet plenum 62 and illustrative pump casings 58 with pump casings having outlets directly connected with primary coolant inlets of the steam generator.

The preferred embodiments have been illustrated and described. Obviously, modifications and alterations will occur to others upon reading and understanding the preceding detailed description. It is intended that the invention be construed as including all such modifications and alterations insofar as they come within the scope of he appended claims or the equivalents thereof.

I claim:

1. An apparatus comprising:
   a pressurized water reactor (PWR) including:
   a cylindrical pressure vessel with its cylinder axis oriented vertically, a nuclear reactor core disposed in the cylindrical pressure vessel, a separator plate disposed in the cylindrical pressure vessel that separates the pressure vessel to define an internal pressurizer containing a pressurizer volume disposed above the separator plate and a reactor vessel portion defining a reactor volume disposed below the separator plate and containing the nuclear reactor core, wherein the separator plate restricts but does not completely cut off fluid communication between the pressurizer volume and the reactor volume, wherein the cross-section of the cylindrical pressure vessel includes a narrowed portion defining a recess of the internal pressurizer wherein the pump motor is disposed at least partially in the recess; and
   a reactor coolant pump including (i) an impeller disposed inside the pressure vessel in the reactor volume, (ii) a pump motor disposed outside of the pressure vessel, and (iii) a drive shaft operatively connecting the pump motor with the impeller, wherein (1) at least a portion of the pump motor is disposed above the separator plate (2) no portion of the reactor coolant pump is disposed in the pressurizer volume and (3) the drive shaft of the reactor coolant pump is oriented parallel with the cylinder axis of the cylindrical pressure vessel.

2. The apparatus of claim 1, wherein the pump motor at least partially overlaps a cross-sectional area of the reactor vessel portion of the cylindrical pressure vessel in a plane transverse to the cylinder axis of the cylindrical pressure vessel.

3. The apparatus of claim 1, wherein the reactor coolant pump comprises N reactor coolant pumps spaced apart at 360°/N intervals around the cylinder axis of the cylindrical pressure vessel where N is an integer greater than or equal to 2.

4. The apparatus of claim 1, wherein:
the PWR further includes a hollow cylindrical central riser disposed concentrically with and inside the cylindrical pressure vessel in the reactor volume; and
the impeller of the reactor coolant pump is configured to impel primary coolant water downward into a downcomer annulus defined between the hollow cylindrical central riser and the cylindrical pressure vessel.

5. The apparatus of claim 4, wherein:
the PWR further includes an internal steam generator disposed in the downcomer annulus.

6. The apparatus of claim 5, wherein the reactor coolant pumps discharge primary coolant into an outlet plenum that spaces apart the reactor coolant pumps and the internal steam generator.

7. The apparatus of claim 6, wherein the reactor coolant pumps discharge primary coolant into the outlet plenum at a radial location respective to the cylinder axis of the cylindrical pressure vessel that is outboard from the radial location of the annular internal steam generator disposed in the downcomer annulus respective to the cylinder axis of the cylindrical pressure vessel.

8. The apparatus of claim 5, wherein the pressure vessel includes a closure at or below the separator plate and at or above the top of the internal steam generator wherein the internal pressurizer is removable to provide access from above to the internal steam generator for performing steam generator tube plugging.

9. The apparatus of claim 4, wherein the reactor coolant pump further comprises an annular pump casing containing the impeller, the annular pump casing having an inlet receiving primary coolant water from the top of the hollow cylindrical central riser and an outlet in fluid communication with the downcomer annulus.

10. The apparatus of claim 4, wherein the reactor coolant pump further comprises a 90° angled pump casing containing the impeller wherein the inlet faces horizontally and the outlet faces downwardly, the inlet being in fluid communication with the top of the hollow cylindrical central riser and the outlet being in fluid communication with the downcomer annulus.

11. The apparatus of claim 1, wherein the cylindrical pressure vessel includes an opening through which the drive shaft of the reactor coolant pump passes wherein said opening is too small for the impeller to pass through.

12. The apparatus of claim 11, wherein said opening through which the drive shaft of the reactor coolant pump passes includes a self-lubricating graphalloy bearing supporting the drive shaft.

13. The apparatus of claim 12, further comprising a manway disposed at or below the impeller that is large enough for the impeller to pass through.

14. The apparatus of claim 1, wherein the internal pressurizer disposed above the separator plate is of smaller cross-sectional diameter over its entire height than the reactor vessel portion defining the reactor volume disposed below the separator plate, and the smaller cross-sectional diameter of the internal pressurizer accommodates the pump motors.

15. An apparatus comprising:
a pressurized water reactor (PWR) including: a nuclear reactor core, a pressure vessel having a closure by which an upper vessel head of the pressure vessel is removable, wherein the nuclear reactor core is disposed in the pressure vessel below the vessel head and wherein the upper vessel head includes an internal pressurizer defining a pressurizer volume with heaters configured to control PWR pressure, wherein the cross-section of the upper vessel head of the cylindrical pressure vessel includes a narrowed portion defining a recess of the internal pressurizer wherein the pump motor is disposed at least partially in the recess; and
a plurality of reactor coolant pumps mounted on the vessel head such that the vessel head and plurality of reactor coolant pumps are removable as a unit, each reactor coolant pump including (i) an impeller disposed inside the pressure vessel below the internal pressurizer, (ii) a pump motor disposed outside of the pressure vessel, and (iii) a drive shaft operatively connecting the pump motor with the impeller, wherein the drive shaft of each reactor coolant pump is oriented vertically and
no portion of any reactor coolant pump is disposed in the pressurizer volume.

16. The apparatus of claim 15, wherein:
the pressure vessel is cylindrical with it cylinder axis oriented vertically;
the PWR further includes a hollow cylindrical central riser disposed concentrically with and inside the cylindrical pressure vessel; and
the impellers of the reactor coolant pumps are arranged to impel primary coolant water downward into a downcomer annulus defined between the hollow cylindrical central riser and the cylindrical pressure vessel.

17. The apparatus of claim 16, wherein:
the PWR further includes an internal steam generator disposed in the downcomer annulus; and
the reactor coolant pumps discharge primary coolant into an outlet plenum that separates the reactor coolant pumps from the internal steam generator.

18. The apparatus of claim 17, wherein the reactor coolant pumps discharge primary coolant into the outlet plenum at a radial location respective to the cylinder axis of the cylindrical pressure vessel that is outboard from the internal steam generator disposed in the downcomer annulus respective to the cylinder axis of the cylindrical pressure vessel.

19. The apparatus of claim 15, wherein the upper vessel head and plurality of reactor coolant pumps are removable as a unit and the pressure vessel includes openings through which the drive shafts of the reactor coolant pumps pass wherein said openings are too small for the impellers to pass through.

20. The apparatus of claim 15, wherein the internal pressurizer is of smaller cross-sectional diameter over its entire height than the pressure vessel below the upper vessel head, and the smaller cross-sectional diameter of the internal pressurizer accommodates the pump motors.

21. An apparatus comprising:
a pressurized water reactor (PWR) including:
a nuclear reactor core comprising a fissile material, a cylindrical pressure vessel with its cylinder axis oriented vertically, the cylindrical pressure vessel having a lower portion containing the nuclear reactor core and an upper vessel head defining an internal pressurizer, wherein the cross-section of the upper vessel head of the cylindrical pressure vessel includes a narrowed portion defining a recess of the internal pressurizer wherein the pump motor is disposed at least partially in the recess; and a reactor coolant pump mounted on the vessel head and including (i) an impeller disposed inside the pressure vessel, (ii) a pump motor disposed outside of the pressure vessel, and (iii) a vertical drive shaft connecting the pump motor and the impeller, the vertical drive shaft being oriented parallel with the vertically oriented cylinder axis of the cylindrical pressure vessel and not passing through the internal pressurizer.

22. The apparatus of claim 21, wherein the cylindrical pressure vessel includes a closure by which the upper vessel head is removable from the remainder of the pressure vessel.

23. The apparatus of claim 22, wherein the PWR further comprises:

a hollow cylindrical central riser disposed concentrically with and inside the cylindrical pressure vessel, the impeller of the reactor coolant pump being configured to impel primary coolant water downward into a downcomer annulus defined between the hollow cylindrical central riser and the cylindrical pressure vessel.

24. The apparatus of claim 23, wherein the PWR further comprises:

an internal steam generator disposed in the downcomer annulus;

wherein the impeller of the reactor coolant pump and the internal steam generator are spaced apart by an outlet plenum.

25. The apparatus of claim 24, wherein the cylindrical pressure vessel includes a manway providing access to the outlet plenum.

26. The apparatus of claim 24, wherein the reactor coolant pumps are at a larger diameter than the internal steam generator disposed in the downcomer annulus.

27. The apparatus of claim 21, wherein the internal pressurizer is of smaller cross-sectional diameter over its entire height than the lower portion of the pressure vessel, and the smaller cross-sectional diameter of the internal pressurizer accommodates the pump motors.

* * * * *